Aug. 10, 1965  B. R. CALLAHAN  3,200,312
CAPACITANCE PROBE FOR FLUIDS
Filed Aug. 24, 1961
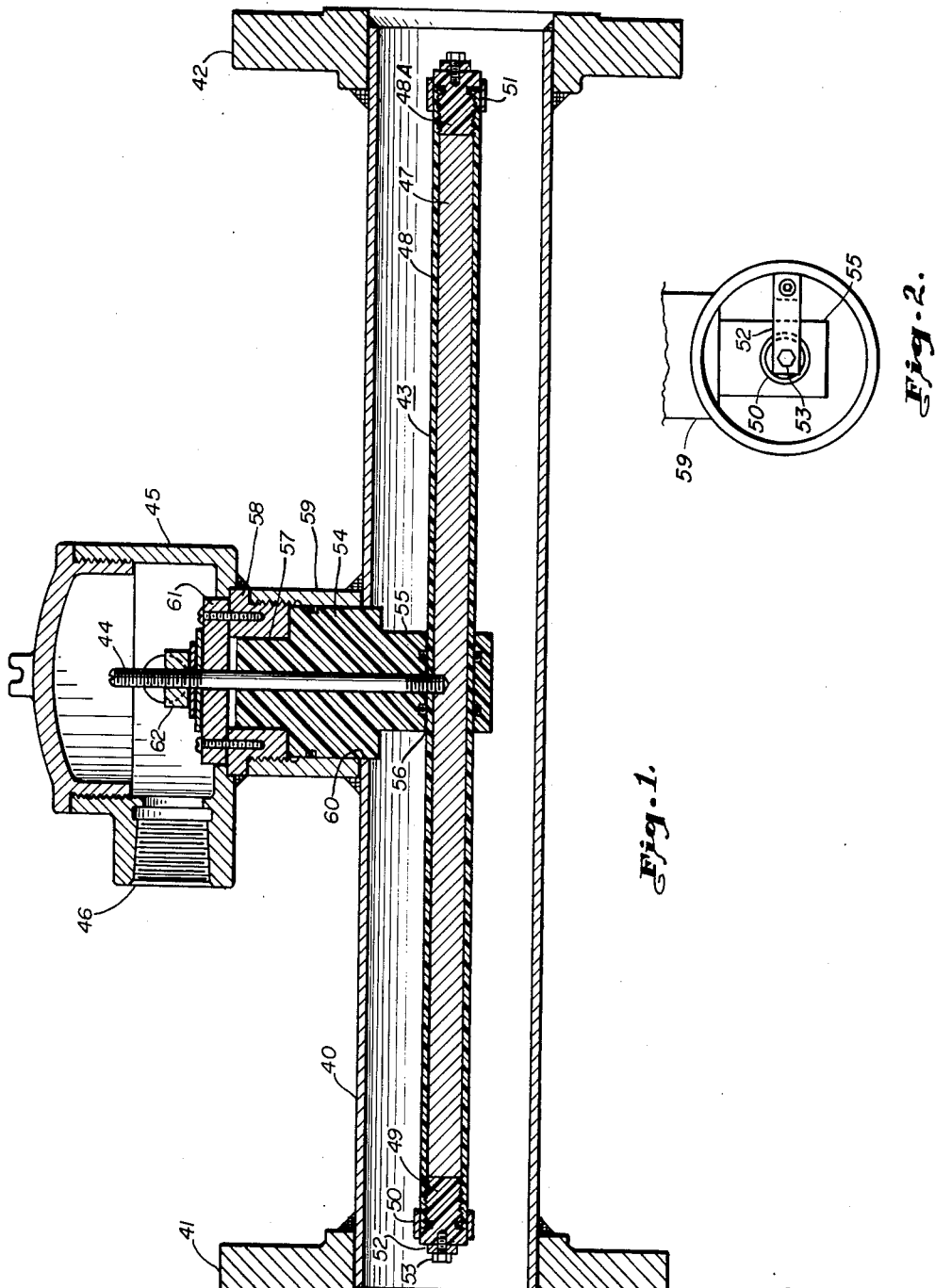
INVENTOR.
BILL R. CALLAHAN
BY Arthur L Wade
ATTORNEY

United States Patent Office 3,200,312
Patented Aug. 10, 1965

3,200,312
CAPACITANCE PROBE FOR FLUIDS
Bill R. Callahan, Tulsa, Okla., assignor to National Tank Company, Tulsa, Okla., a corporation of Nevada
Filed Aug. 24, 1961, Ser. No. 133,732
3 Claims. (Cl. 317—246)

The present invention relates to electrodes which are included in measuring circuits as primary elements responsive to the dielectric constant of measured material. More particularly, the invention relates to a structure which enables the circuit to manifest the dielectric constant of a measured mixture over the full range of proportions of the constituents of the mixture without a discontinuity in the manifestation.

Several circuits, using the basic principle of detecting the dielectric constant change, have been used to measure and record basic sediment and water in production from an oil well. One of these circuits is disclosed and claimed in United States patent Gunst et al. 2,720,624 issued October 11, 1955.

In the December 8, 1958, issue of the Oil & Gas Journal an article by Robert S. Wood, entitled, "Capacitance Type B.S. & W. Recorder Features Automatic, Continuous Operation," stated that field tests have established the range of the B.S. & W. recorder as reliable up to 55% water in oil well production. Measurements were made with an electrode coated by an insulating plastic film. The manifestation of the circuit including the probe, in terms of dielectric constant suddenly jumped between 50 and 60% water.

The Wood article described much data from measurements made of mixtures comprising crude petroleum and water of varying degrees of salinity. Wood drew the conclusion that a manifestation with continuity may be obtainable to a very high water percentage, up to 100%, with distilled water emulsions. However, Wood also concluded it is not possible to attain valid measurements up to 100% because of the discontinuity in the manifestation of the circuit appearing in the region of 50 to 60% of salt water.

The experience of the applicant with measuring the dielectric constant of various mixtures of crude petroleum and B.S. & W. was similar to that described in the Wood article. However, the problem of discontinuity was solved by the invention of this application.

A principal object of the present invention is to obtain a continuity of manifestation of a circuit measuring dielectric constant change as the percentage of B.S. & W. in oil well production increases to 100%.

Another object is to so electrically insulate between the plates of a primary element capacitor that an including circuit will exhibit no discontinuities in its manifestation of the dielectric constant of oil well production with varying amounts of B.S. & W.

The present invention contemplates an electric circuit which utilizes a capacitor as a primary element, the capacitor having one of its electrodes, or plates, in rod-like form. The plates have an effective electrical insulation established between them by mounting a sheath of insulating material over the electrode which is in the form of a rod. Electrically insulated by a sheath of material having particular properties, the primary element enables the manifestation of the dielectric constant of mixtures of well production and water to have a continuity over any proportion of water and oil quantities.

Other objects, advantages and features of this invention will become apparent to one skilled in the art upon consideration of the written specification, appended claims, attached drawings, wherein:

FIG. 1 is a sectioned elevation of a primary element for a circuit directly responding to the dielectric constant of fluids and embodying specific features of the invention; and FIG. 2 is an end view of the structure of FIG. 1 in the direction of 2—2.

The probe 13 is shown in detail by means of FIGS. 1 and 2. With the sectioned elevation of FIG. 1, the probe can be seen as based about a casing 40 having flanges 41 and 42 welded to each end. Casing 40 and flanges 41, 42 enable the primary element to be mounted as a section of a conduit. With the fluids of the conduit flowing through casing 40, electrical connections then incorporate the electrode-capacitance plate into the circuit of an instrument responsive to the capacitance of probe 13, or the dielectric constant of the fluids.

The casing 40 is one plate of the probe 13 as a primary element capacitor. The second plate is a rod-like form of electrode mounted along the axis of casing 40. The measured fluid, passing through casing 40, around the central electrode, between these "plates," has its dielectric constant manifested by an attached instrument.

The electrode mounted coaxial within casing 40 is generally designated 43. A mechanical structure holds the electrode assembly in place. An electrical connection is completed by means of stud 44 extending down to the active element of the electrode assembly 43 and up into terminal housing 45. From the top of stud 44, electrical wiring, not shown, is introduced through housing opening 46, for direct connection into the circuit of the manifesting instrument.

Electrode assembly 43

The assembly 43 has a steel rod 47 as a central, active portion of the electrode. This rod 47 is, effectively, one capacitor plate of the primary element. In form, this rod 47 is a solid cylinder oriented to extend along the casing 40.

A primary feature of the invention is structure which maintains the rod 47 effectively insulated, electrically, from the wall of the casing 40. To embody this feature of the invention, an enclosure is formed about rod 47 which is broken only by connecting stud 44 making electrical contact with the center of the rod 47 for incorporation of rod 47 in a manifesting circuit.

The insulating enclosure is basically formed by a thin-walled sheath of tetrafluorethylene, marketed under the DuPont trademark Teflon. This tube 48, or sheath, of Teflon extends the length of rod 47 and beyond each end. Plugs 48A and 49 are formed of Teflon and threaded into the ends of tube 48 to abut the ends of electrode rod 47. The plugs 48A and 49 are sealed by O-rings to the inside wall of the sheath 48 and retaining rings 50 and 41 are clamped over the outside ends of the sheath 48. The function of this combination is to seal electrode rod 47 effectively from physical contact with the fluids of conduit 10 and insulate electrode rod 47 effectively from the wall of casing 40.

Electrode assembly mounting

The electrode assembly 43 is mechanically mounted from the middle of its length and made secure by supports at its ends. FIG. 2 shows the details of these end mountings. Essentially, at each end of the electrode assembly 43, a strap 52 is welded by one end to the inside of casing 40 and fixed by a cap screw 53 to the end plug.

The central mounting is basically provided with a bushing 54, formed from a cylinder of Teflon. The cylinder of bushing 54 is shown as reduced in diameter at each end. The lower portion 55 of reduced diameter has a hole 56 formed transverse the axis of the bushing as a cylinder, large enough to receive electrode assembly 43 in a tight fit. Further, the central connection with conductor rod 44 is sealed from the fluids of casing 40 with O-rings. Conductor rod 44 is positioned in a coaxial hole of cylindrical bushing 54, extending down through sheath 48 and threading into electrode 47 for both the electrical connection with this active element of the electrode assembly and mechanical support.

The upper portion of bushing 54 is reduced to the diameter at 57 which will enable it to be extended up into the bore of cap 58. Cap 58, in turn, threads down into nipple 59 which is welded over hole 60, formed through the wall of casing 40. Cap 58 is flanged to come against the top rim of nipple 49.

A washer 61 of structurally strong, electrically insulating material is bolted to the top of cap 58. Conductor rod 44 extends up through the central bore of washer 61 and a nut 62 threaded down to engage washer 61, or washers between washer 61 and nut 62. Nut 62, abutting washer 61, cap 58 and nipple 59, forms the structural support for conducting rod 44 and the electrode assembly 43 attached to the lower end of rod 44. The cap 58 then has the electrical terminal housing 45 welded to its top.

*Operation*

The electrode assembly 48 is mounted within casing 40, to function as one of the two active elements of the probe as a capacitor. The casing 40 is the second of the two active elements. Between these two elements the production of an oil well is flowed. The capacitance between these two capacitor "plates" feeds into an electric network as an input signal. The output of the circuit is manifested, be it in the form of an indication, a recordation, or a control action.

The insulating sheath 48 functions to prevent formation of a conductive path between the rod 47 and casing 40. The electrical relation between these two active elements of the probe, as a capacitor, is the capacitance between them. This capacitance is a function of the ratio of water and oil in the production. Insulated in this manner, the probe feeds an input signal into the circuit which gives an output having a continuity which can be calibrated in terms of the net oil in the production over the full range of oil-water ratio in the production.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The present invention having been described, what is claimed is:

1. A capacitance measuring element including,
 a tubular metallic casing adapted to be incorporated into a conduit as a section of the conduit through which all material passes to have its capacitance measured, the casing functioning as a first of the two active elements of the capacitance element,
 a cylindrical metallic rod mounted to extend parallel the axis of the tubular casing and function as the second of the two active elements of the capacitance element,
 a nipple mounted on the external wall of the casing and over a hole in the casing wall,
 a metallic stud connector extending through the nipple and hole in the casing to make electrical contact with the rod,
 means in the nipple to insulate the stud from the nipple and seal the hole to prevent escape of material from the casing,
 and a sheath of electrically insulating material about the rod to protect the rod from contact with the material passing through the casing.

2. A capacitance measuring element including,
 a tubular metallic casing adapted to be incorporated into a conduit as a section of the conduit through which all material passes to have its capacitance measured, the casing functioning as a first of the two active elements of the capacitance element,
 a cylindrical metallic rod mounted to extend parallel the axis of the tubular casing and function as the second of the two active elements of the capacitance element,
 a nipple mounted on the external wall of the casing and over a hole in the casing wall,
 a bushing member extending from the nipple into the casing to seal fluid-tight to the sides of the nipple and mechanically attached to the rod as at least part of the mounting which holds the rod along the axis of the casing,
 a metallic stud connector extending through the bushing member to make electrical contact with the rod,
 and a sheath of electrically insulating material about the rod to protect the rod from contact with the material passing through the casing.

3. A capacitance measuring element including,
 a tubular metallic casing adapted to be incorporated into a conduit as a section of the conduit through which all material passes to have its capacitance measured, the casing functioning as a first of the two active elements of the capacitance element,
 a cylindrical metallic rod mounted to extend parallel the axis of the tubular casing and function as the second of the two active elements of the capacitance element,
 a nipple mounted on the external wall of the casing and over a hole in the casing wall,
 a metallic stud connector extending through the nipple and hole in the casing to make electrical contact with the rod,
 means in the nipple to insulate the stud from the nipple and seal the hole to prevent escape of material from the casing,
 and a sheath of electrically insulating material about the rod to protect the rod from contact with the material passing through the casing, including,
  (a) a tube of insulating material extending the length of the rod and beyond each end,
  (b) a plug of insulating material in each end of the tube abutting the end of the rod,
  (c) and a retaining ring clamped over each outside end of the tube and plug to seal the rod effectively from contact with the material passing through the casing.

References Cited by the Examiner

UNITED STATES PATENTS

| 2,349,992 | 5/44 | Schrader | 324—61 X |
| 2,785,374 | 3/57 | Fay et al. | 324—61 X |

DARRELL L. CLAY, *Primary Examiner.*

WALTER L. CARLSON, JOHN F. BURNS, *Examiners.*